Patented June 9, 1936

2,043,547

UNITED STATES PATENT OFFICE 2,043,547

DIAMINO-PYRIDINE O-HYDROXY BENZOIC ACID SALTS

Jacques Krassny, New York, N. Y., assignor to Osten Chemical Corporation, New York, N. Y., a corporation of New York No Drawing. Application November 29, 1929, Serial No. 410,452

10 Claims. (Cl. 260—42)

This invention relates to new chemical compounds obtained by coupling aminopyridines

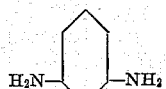

with hydroxybenzoic acids

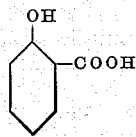

A particular object of the invention is to produce a series of new compounds containing the above mentioned molecules combined to form new molecules, practically non-toxic in nature and found to be efficient for use in the treatment of different germ diseases.

It is known that aminopyridines, derivatives of pyridine, in which one or more H atoms are substituted for one or more $NH_2$ group, are basic in reaction, water soluble and physiologically strong poisonous, while ortho-hydroxybenzoic acid, a derivative of benzol, is acid in reaction, very slightly soluble in water and practically nontoxic in its physiological action.

Example 1.—350 gms. of 2.6 diaminopyridine are dissolved in 6000 cc. of distilled water. The solution is boiled and while boiling ortho-hydroxybenzoic acid is added gradually in small portions till the reaction of the mixture is very slightly acid. About 450 gms. of ortho-hydroxybenzoic acid are used for this process, which is approximately 1 molecule 2.6 diaminopyridine to one molecule of ortho-hydroxybenzoic acid. The mixture is now boiled for one and one-half to two hours, using a reflux cooler. While still hot, the liquid is filtered. After filtration, it will become cloudy and after being permitted to stand for about 48 hours comparatively large, salt-like crystals are obtainable, forming mostly large "salt rosettes". The yield, according to this process, is not as great as can be obtained, this process being brought out to show the possibility of combining the compound. In the present process, large quantities of free diaminopyridine are present in the filtrate, as well as free ortho-hydroxybenzoic acid in the residue. The latter can be freed from the free ortho-hydroxybenzoic acid with ether, in which the new compound is very little soluble, while ortho-hydroxybenzoic acid is very soluble in the ether.

Example 2.—I have found that the process can be greatly improved if the mixture, after boiling with a reflux cooler, as described in Example 1, is treated under a pressure of from 25 to 30 pounds for one-half to one hour. I have further observed that compounds of the same type but of different solubility in water are formed if, instead of one molecule ortho-hydroxybenzoic acid onehalf, one and one-half or two molecules are used in the process.

The final recrystallized and purified products showed the following general chemical and physical properties;

Light yellowish, or yellowish green, slightly transparent, salt-like crystals practically tasteless and odorless of a neutral or very slightly acid reaction in water. (Litmus paper used for test.) Melting point 159 to 160 centigrade, soluble in alcohol, acetone and glycerin, insoluble in benzol, toluol, chloroform, ether and mineral or fatty oils. No precipitate or cloudiness is formed upon addition of sodium hydroxide, sodium carbonate or hydrochloric acid. Formaldehyde causes a white, caseous precipitate changing into brown after boiling, (diaminopyridine reaction, decomposition into a methylene-amine-compound). Boiling with water-free glycerine causes a yellowish red color with a distinct green fluescence and a peculiar odor, (probably a transformation of the pyridine ring into a quinoline-compound). Addition of ferric chloride gives a red violet color, (ortho-hydroxybenzoic acid reaction).

I have discovered that the described compounds have a distinct destroying action on different bacteria in vitro and in vivo in the shortest time and that they are far superior in this direction to any of the ortho-hydroxybenzoic acid compounds known and I therefore regard these compounds as valuable medical agents. They can be used externally as well as internally in the form of different strength solutions, as ointments, in powder form, applied by mouth, subcutaneously and intravenously.

As to the possible structural formulas of these compounds, I wish to state that theoretically several possibilities exist and therefore I do not want to limit myself in this direction. For instance, 2.6 diaminopyridine may be combined with one molecule of ortho-hydroxybenzoic acid by one of its amino groups. But the diaminopyridines can also act as two basic compounds in which case both amino groups are reacting with ortho-hydroxybenzoic acid. Also any other H atoms of the pyridine ring may react with another molecule. Furthermore, the nitrogen of the pyridine ring, which is normally present in an trivalent state, can build additional products changing into a pentavalent N. As finally ortho-hydroxybenzoic acid also form with alkalies, two kinds of salts, namely mono- and di- ortho-hydroxybenzoates, in which case the H of the carboxyl group, as well as the H of the OH group, reacts with another molecule, an ortho-hydroxybenzoic di 2.6 diaminopyridine would be the result.

While I have described my processes in the preparation of 2.6 aminopyridine ortho-hydroxybenzoates and their usefulness in the treatment of human diseases with some degree of particularity, I realize that in practice various alterations therein may be made and I therefore claim the right and privilege of changing the details of my description within the spirit of the invention or the scope of the appended claims.

Having thus described my invention what I claim is:—

1. The process of preparing a chemical product which consists in dissolving 2.6 diaminopyridine, boiling the solution, then adding thereto during boiling orthohydroxybenzoic acid to produce a slight acid reaction, then further boiling the solution, then filtering the solution while hot, and then permitting the same to stand until formation of the product in crystal form.

2. The process of preparing a chemical product which consists in dissolving 2.6 diaminopyridine, boiling the solution, adding thereto while boiling an ortho-hydroxybenzoic acid compound to produce a slight acid reaction, then further boiling the solution with a reflux cooler, then permitting the solution to stand until formation of the product in crystal form.

3. The process of preparing a chemical product which consists in dissolving 2.6 diaminopyridine in water, boiling the solution, adding thereto while boiling, ortho-hydroxybenzoic acid to produce a slight acid reaction of the solution, then further boiling the solution with a reflux cooler, then filtering the solution while hot, and then permitting the solution to stand until the formation therein of the product in crystals.

4. The process of preparing a chemical product which consists, in addition to the steps set forth in claim 3, in treating the solution under a pressure of from 25 to 30 pounds for a period of from one-half to one hour after boiling in said reflux cooler.

5. The process of preparing a chemical compound which consists in forming a new chemical molecule by letting ortho-hydroxybenzoic acid react with 2.6 diaminopyridine until such reaction forms the said molecule.

6. The process of preparing a chemical compound which consists in dissolving one molecule of 2.6 diaminopyridine in water, then adding thereto, one molecule of ortho-hydroxybenzoic acid, boiling the mixture, filtering, and then permitting the same to stand until formation of the product in crystal form.

7. The process of preparing a chemical compound which consists in dissolving one molecule of 2.6 diaminopyridine in water, then adding thereto one-half molecule of ortho-hydroxybenzoic acid, boiling the mixture and then permitting the same to stand until the formation of the product in crystal form.

8. The process of preparing a chemical compound which consists in dissolving one molecule of 2.6 diaminopyridine in water, then adding thereto two molecules of ortho-hydroxybenzoic acid, boiling the mixture and then permitting the same to stand until formation of the product in crystal form.

9. The process of preparing a chemical compound which consists in treating 2.6 diaminopyridine and ortho-hydroxybenzoic acid in the presence of water by heat, and cooling the resulting mixture until the formation of the product in crystal form is obtained.

10. Ortho-hydroxy-benzoic acid salts of 2.6 diaminopyridine having the characteristics of forming crystals and being useful in different forms in the treatment of germ diseases.

JACQUES KRASSNY.